Figure 1:
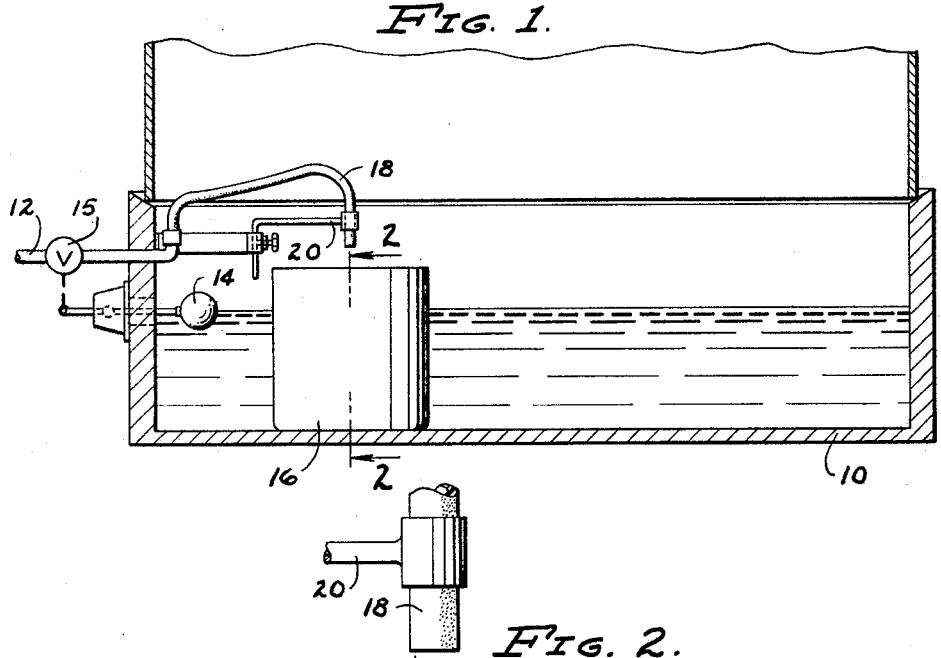

July 25, 1967     M. L. ROBINSON     3,332,871

WATER TREATMENT

Original Filed Aug. 18, 1964

INVENTOR
MYRON L. ROBINSON
BY HIS ATTORNEYS
HARRIS, KIECH, RUSSELL & KERN

United States Patent Office 3,332,871
Patented July 25, 1967

3,332,871
WATER TREATMENT
Myron L. Robinson, 411 S. Chandler Ave.,
Monterey Park, Calif. 91754
Continuation of abandoned application Ser. No. 390,328,
Aug. 18, 1964. This application June 27, 1966, Ser. No.
560,984
10 Claims. (Cl. 210—60)

This application is a continuation of my copending application Ser. No. 390,328, filed Aug. 18, 1964, now abandoned.

This invention relates generally to water treating and provides an improved method of introducing water treating chemicals into a recirculating water system and a composition suitable for use in the process. The invention also relates to a novel protective film formed over the water-exposed surfaces of the system and to the method of forming the film.

Innumerable methods and chemicals have been suggested and used for the treatment of the water of recirculating systems, e.g., of a cooling tower system. Some treating procedures require the introduction at spaced intervals by a caretaker of as many as four or five different chemicals. The various materials are added to control algae, fungi, and slime and to minimize scale formation. Normally, a material is also added as a corrosion inhibitor. Oftentimes, the method of introducing the treating chemical requires the installation of special chemical feeding equipment and depends on the occasional visit of a water chemist. Treating materials frequently employed are corrosive and must be handled with care by the maintenance man.

It is a principal object of the invention to provide a method of introducing a water treating material into the water of a recirculating system to the make-up flow.

It is another object of the invention to provide an improved method for the control of scale, corrosion, algae, slime, and fungi in a water cooling tower or other water recirculating system.

It is another object of the invention to provide a method of introducing water treating chemicals to the water of a recirculating system requiring substantially no maintenance attention.

It is a still further object of the invention to provide an improved method of introducing water treating chemicals into the water of a water recirculating system whereby the chemicals are added periodically and in amounts that tend to provide a shock treatment for the water of the system.

It is a still further object of the invention to provide a method of introducing water treating chemicals into the water of a recirculating system such as a cooling tower system wherein the amount of chemicals introduced at a time is gaged to the length of time since the last addition of chemicals.

It is a further object of the invention to provide a method of chemically treating the water of a water recirculating system whereby a protective film is formed over the water-exposed surfaces of the system.

It is an object of the invention to provide a method of conditioning a fouled and neglected system having an acid-soluble scale for treatment with conventional descaling acids.

It is a still further object of the invention to provide a composition of matter that may be used as the single chemical additive for the treatment of the water of a water recirculating system.

In the improved method of the invention for introducing a water treating and water dispersible chemical into the water of a water recirculating system, an open-top container holding the chemical is placed beneath the spout of a make-up water inlet. The intermittent introduction of water into the container causes small amounts of the treating chemical agent to be discharged from the container into the water of the system. Usually, the treating chemical is dispersed in a water-soluble carrier; a material such as urea is especially suitable for this purpose. In a preferred embodiment of the method of the invention, there is provided a heterogeneous solid mixture of a water-soluble hexametaphosphate and a cationic surface active agent dispersed in a solid, water-soluble carrier in the open-top container. If a solid, water-dispersible cationic agent is employed rather than a liquid cationic agent, the solid, water-soluble carrier may be dispensed with.

Desirably, a water-permeable chemical diffusion barrier rests on the solid heterogeneous mixture and slows the dissolution of the mixture with the admission of water to the container. Especially suitable for use as the chemical diffusion barrier is a sponge-like material such as a flexible, open-cell polyurethane or other elastomer polymer which may be provided in a disc or other suitable configuration to rest on the upper surface of the heterogeneous solid mixture. It has been found that the best practice is to provide a layer of small stones on the upper surface of the polyurethane pad with a wide mesh screen therebetween, thus assuring uniform level for the rock layer.

While various cationic surface active agents may be used, the quaternary ammonium compounds are generally most suitable. The water-soluble hexametaphosphate and the cationic surface active agent are most desirably dispersed in urea as the solid carrier.

The water treating system of the invention may be used for the treatment of various open, water recirculating systems such as evaporative condensers, spray ponds, waterfall purification systems, cooling tower systems, and the like.

Figure 2:
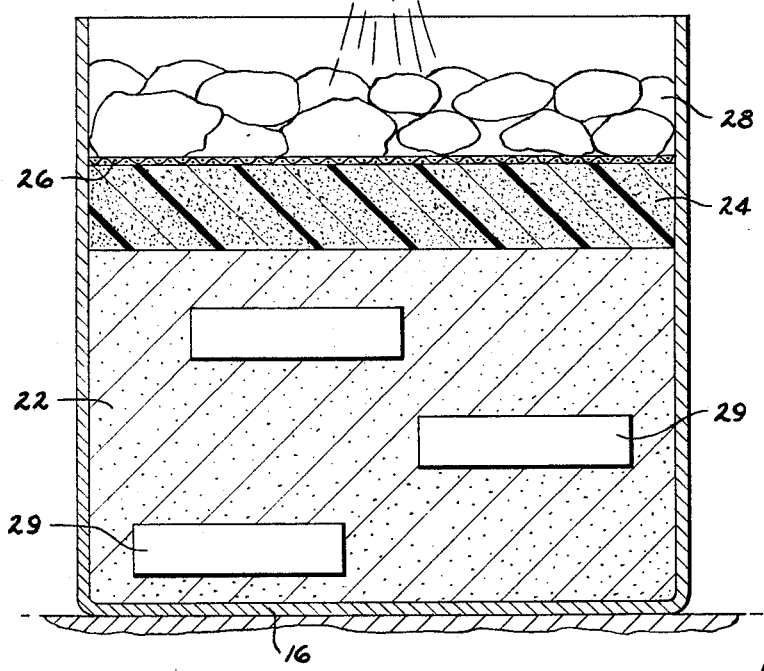

These and other objects and advantages of the process and composition of matter of the invention will become more apparent in view of the following specification and drawings, wherein:

FIG. 1 is a schematic representation of a catch basin of a typical water cooling tower modified for the practice of the process of the invention; and FIG. 2 is a longitudinal sectional view taken along line 2—2 of FIG. 1 of a container used for holding the treating chemical of the invention.

There is illustrated in FIG. 1 a catch basin 10 of a conventional cooling tower structure which is provided with a make-up water inlet 12 and a float arrangement 14 for controlling the level of the water in the basin by manipulation of a valve 15. A can or container 16 is placed beneath the makeup water inlet to receive the makeup water added to the water cooling tower system. Desirably, the makeup water is admitted to the container 16 through a flexible tube 18 which is adjustably supported by a bracket 20 above the can 16. By adjustment of the bracket 20, the outlet of the tube 18 may be raised or lowered to give the desired turbulence for the dissolution of the chemicals in the container 16. The flexible tube 18 is desirably made of a semi-rigid polyethylene or copper pipe which may be readily flexed.

The container 16 contains treating material 22 as a lower layer, a second layer in the form of a polyurethane sponge 24 overlying the treating material, a wide mesh screen 26, and a layer 28 of rocks. In the particular embodiment illustrated, there are several bars 29 embodied in the matrix of the treating material 22. The bars 29 will be of different substance than the matrix and may be, for example, a pure and extremely soluble substance (say a solid quaternary ammonium material) which, upon dissolution, will provide a shock and varied treatment to the water system. The bars 29 may be a chemical supported on a water-soluble carrier.

The water treating material of layer 22 is compounded in the following typical fashion. Two pounds of 80% quaternary ammonium compound or other suitable cationic material (which may be a liquid) is placed in a pail or container. Two pounds of urea is heated with a small amount of water, about .6 pound, to 220° F. The heated urea is added to the quaternary material in the pail and intimately mixed. Thereafter, about four pounds of sodium hexametaphosphate is added to the pail and the mixture stirred to a "mashed potatoes" consistency while cooling in a water bath. The amounts of water and urea employed may be altered to give the desired solidity to the mixture. The mixture in the container 16 is a heterogeneous solid mass and will slowly dissolve on exposure to water. The bars 29 may be positioned within the container 16 while the mixture is still plastic and before it has set.

It will be appreciated that the ingredients of the heterogeneous mass may be employed in somewhat varying quantities. The preferred range weightwise is approximately .8–3.2 parts of quaternary ammonium or other cationic compound to .75–3.0 parts urea, and 2–8 parts sodium hexametaphosphate. Other water-soluble hexametaphosphate materials may be used, for example, potassium hexametaphosphate.

The quaternary ammonium compounds and other cationic surface active agents serve in a multiple role. Quaternary materials are generally algicidal and fungicidal and will also combat slime in the cooling tower or other recirculating water system. The quaternary materials inhibit corrosion to some extent. The cationic agents generally are wetting agents and will serve to suspend foreign solids in the cooling tower water. The quaternary materials foam, thus providing a visual indication of their presence and tend to stabilize the water against scale.

It is repeatedly reported in the literature that the quaternary ammonium materials are incompatible with hexametaphosphate. It is a principal feature of the invention that the materials may be used together and used together to a decided advantage. The combination of quaternary ammonium compound and hexametaphosphate forms a tacky, thin film, apparently a reaction product of the two materials, over the water-exposed surfaces of the water cooling tower. This film has high biocidal properties and will function for a period of time, when once formed, without the addition of further materials to the water. The film prevents the build-up of the typically hard, tightly adhering scale so frequently found on water cooling tower surfaces. The scale that may form under treatment is loosely held and may be readily dislodged by hosing down of the surface. Apparently, the film reacts with the scale to swell and loosen the scale, thus permitting its ready dislodgment.

The cationic agent and the hexametaphosphate are especially effective in treating the scale (e.g., a carbonate scale) of a neglected and fouled system in preparation for an acid treatment with conventional descaling acids, such as sulfuric acid.

Numerous cationic agents are available for use in the process of the invention. Cationic agents are generally recognized as potent germicides. Particularly suitable are the nitrogen-containing materials including the quaternary ammonium compounds such as alkyl dimethyl benzyl ammonium chlorides which are particularly desirable materials. The latter material is available with different mixtures of alkyl groups, for example, a particularly suitable one contains 60% $C_{14}$, 30% $C_{16}$, 5% $C_{12}$, and 5% $C_{18}$. Among the various cationic materials that are available for use in the process of the invention are: stearyl dimethyl benzyl ammonium chloride, tallow trimethyl ammonium chloride, phenyl trimethyl ammonium chloride, alkyl methyl isoquinolinium chloride, tallow dimethyl benzyl ammonium chloride, di-tallow dimethyl ammonium methyl sulfate, cetyl dimethyl amine oxide; lauryl dimethyl amine oxide, cetyl dimethyl benzyl ammonium chloride, cetyl dimethyl ethyl ammonium bromide, alkyl dimethyl benzyl ammonium chloride (especially preferred), alkyl dimethyl dimethylbenzyl ammonium chloride, alkyl imidazoline derivatives, dialkyl dimethyl ammonium bromide, alkyl dimethyl ethylbenzyl ammonium chloride (another preferrd material), alkyl isoquinolinium bromide, 1 (2 hydroxyethyl), 2 n heptadecenyl-2 imidazoline, lauryl dimethyl amine, myristyl dimethyl amine, alkenyl dimethyl ethyl ammonium bromide, alkyl dimethyl hydroxyethyl ammonium chloride, and alkyl dimethyl 3,4 dichlorobenzyl ammonium chloride. Preferably, cationic materials with hard water tolerance, i.e., materials that are biocidal in the presence of hard water, are used.

The water-soluble hexametaphosphate materials used in the process and composition of the invention stabilize water against scale formation and mineral deposits generally. The materials also serve as a corrosion inhibitor. The remarkable protective film resulting from the joint use of the hexametaphosphate material and the cationic agent has been described above.

The treating material comprising the lower layer 22 of the container is slowly water soluble and solid. It has been found that the use of a liquid is not satisfactory as liquid-treating materials are removed from the can in too short a period. The material of the layer 22 need not be a firm solid but may be somewhat plastic or semi-solid in structure. A material capable of being poured at room temperature is generally unsuitable. An operator my depress the float valve 14 for a short period of time to obtain a longer duration of discharge of the chemical compound into the system.

Many of the cationic agents, especially the quaternary ammonium compounds, are liquid or near liquid at room temperature and cannot be used alone as the chemical treating layer 22 of the container. In order to use such a material it is combined with a solid carrier which itself is water soluble. Various materials may be used as the solid carrier. The preferred material is urea. The urea has the ability of enhancing the properties of quaternary ammonium compounds, especially so in hard waters. For this reason, urea is a preferred material since it not only serves in a solidifying role but also improves the performance of the quaternary ammonium material. Other water soluble solid carriers that may be employed include, for example, the water soluble chlorides, nitrate, and nitrite salts of sodium, ammonium, potassium, and lithium.

The chemical dispensing container of the invention preferably employs the flexible polyurethane sponge pad 24 as it effectively controls the diffusion of the chemical treating material 22 into the water of the rock layer 28. Other water-permeable diffusion layers may be employed which are capable of slowing the dissolution of the chemical treating layer 22 with the admission of water to the container 16. It is even possible where a slowly soluble solid treating mixture may be prepared to operate without the diffusion barrier of a sponge-like pad and rocks. In some instances, treating chemicals can be dispensed without the use of the sponge-like layer, employing only a screen upon which the rocks are supported. This arrangement will result in a faster output of chemicals than with the use of the polyurethane pad.

The use of the process of the invention in the treating of the water of a water cooling tower system minimizes maintenance and provides a system whereby the chemicals are dispensed automatically and in proportion to the amount of makeup water used. The water treating system of the invention employs a single compounded chemical instead of the plurality of materials which are normally separately added to a cooling water tower system. The process of the invention imparts to the water-exposed surfaces of the system a protective film which is non-supportive of the growth of microbiological organisms. Algae, slime, and fungi are rapidly destroyed and controlled. The system provides biocidal potency even in hard waters. The method and composition of the invention are generally suitable with all cooling tower systems and will inhibit the formation of scale. The composition of the invention is nontoxic to humans when dissolved in the recirculating water. It will be appreciated that while the invention has been described with reference to a cooling tower system for illustrative purpose, the invention applies to other water recirculating systems.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A method of introducing water treating chemicals into the water of a recirculating water system having a makeup water inlet, the steps comprising:
   providing an open-top container containing a solid, water-dispersible treating agent and locating said container beneath the make-up water inlet;
   said container having a water-permeable diffusion barrier resting on and covering the surface of said solid treating agent that slows the dissolution of the treating agent with the admission of water into the container and moves downwardly remaining resting on said solid treating agent as said agent is consumed; and
   intermittently introducing water into the container from the make-up water inlet and withdrawing solution from said container into the water of the system.

2. A method of introducing water treating chemicals into the water of a recirculating water system in accordance with claim 1 wherein the water-permeable diffusion barrier comprises a sponge-like diffusion pad separating the flowing water from the treating agent.

3. A method as defined in claim 1 wherein said treating agent comprises a solid mixture of a water-soluble hexametaphosphate and a cationic surface active agent.

4. A method of introducing water treating chemicals into the water of a recirculating water system having a make-up water inlet, the steps comprising:
   providing a heterogeneous solid mixture of a water-soluble hexametaphosphate and a quaternary ammonium compound dispersed in a water-soluble, solid carrier in an open-top container and locating said container beneath the makeup water inlet;
   said container having a water-permeable diffusion barrier resting on said mixture that slows the dissolution of the solid mixture with the admission of water to the container and moves downwardly remaining resting on said solid mixture as said mixture is consumed; and
   intermittently introducing water into said container from the make-up water inlet and withdrawing solution from said container into the water of the system.

5. A method in accordance with claim 4 wherein the water-permeable diffusion barrier is a sponge-like material resting on the heterogeneous solid mixture.

6. A method of introducing water treating chemicals into the water of a recirculating water system having a makeup inlet, the steps comprising:
   providing a heterogeneous solid mixture of a water-soluble hexametaphosphate and a cationic surface active agent dispersed in a water-soluble solid carrier in an open-top container;
   providing a water-permeable sponge-like pad overlying and resting on the heterogeneous solid mixture with small rocks disposed on said pad;
   locating said container beneath the make-up water inlet; and
   intermittently introducing water from the make-up water inlet onto the rocks of the container and withdrawing solution from said container into the water of the system with the pad moving downwardly remaining resting on said mixture as the mixture is consumed.

7. A method in accordance with claim 6 wherein the cationic surface active agent is a quaternary ammonium compound and the water-soluble solid carrier is urea.

8. A chemical dispensing structure comprising an open-top container for positioning below and spaced from a water inlet nozzle, said container having a lower layer including a water-dispersible solid treating agent and a water-permeable diffusion barrier resting on said chemical treating agent and including a water-permeable sponge-like pad covering and resting on said treating agent, and means comprising a plurality of nonfloating objects carried on and substantially covering said pad for moving said pad downwardly remaining resting on said treating agent as said agent is consumed and for breaking up the falling water stream from said nozzle producing a turbulent water flow along the upper surface of said pad.

9. A structure as defined in claim 8 wherein said means for moving includes small rocks disposed on said pad for breaking up water flow and for moving said pad downwardly.

10. In a water treatment system, the combination of:
    a water makeup inlet nozzle;
    an open-top container; and
    means for positioning said nozzle above and spaced from said container and for varying the spacing between said nozzle and container;
    said container having a lower layer including a water-dispersible solid treating agent and a water-permeable diffusion barrier resting on said treating agent and including a water-permeable sponge-like pad covering and resting on said treating agent, and means comprising a plurality of nonfloating objects carried on and substantially covering said pad for moving said pad downwardly remaining resting on said treating agent as said agent is consumed and for breaking up the falling water stream from said nozzle producing a turbulent water flow along the upper surface of said pad.

References Cited

UNITED STATES PATENTS

| | | | |
|---|---|---|---|
| 991,825 | 5/1911 | Bogie | 4—228 |
| 2,097,092 | 10/1937 | Bachman | 23—267 |
| 2,346,632 | 4/1944 | Wolfert et al. | 167—22 |
| 2,565,246 | 8/1951 | Lehmkuhl | 137—268 X |
| 2,802,724 | 8/1957 | Johnson | 137—268 X |
| 2,859,766 | 11/1958 | Shuldener | 21—2.7 |
| 3,036,305 | 5/1962 | Channabasappa et al. | 252—390 |

MORRIS O. WOLK, *Primary Examiner.*

MICHAEL E. ROGERS, *Examiner.*